US012415200B1

(12) United States Patent
Sarnowski

(10) Patent No.: US 12,415,200 B1
(45) Date of Patent: Sep. 16, 2025

(54) MANUAL SPRAY LIMITER FOR WATER TRUCK SPRAY NOZZLE

(71) Applicant: Daniel Erik Sarnowski, Star Valley, AZ (US)

(72) Inventor: Daniel Erik Sarnowski, Star Valley, AZ (US)

( * ) Notice: Subject to any disclaimer, the term of this patent is extended or adjusted under 35 U.S.C. 154(b) by 0 days.

(21) Appl. No.: 19/223,339

(22) Filed: May 30, 2025

(51) Int. Cl.
*B05B 12/32* (2018.01)
*B05B 1/04* (2006.01)
*E01H 3/02* (2006.01)

(52) U.S. Cl.
CPC .............. *B05B 12/32* (2018.02); *B05B 1/046* (2013.01); *E01H 3/02* (2013.01)

(58) Field of Classification Search
CPC ......... B05B 1/046; B05B 1/044; B05B 12/32; B05B 12/36; B05B 1/28; E01H 10/007; E01H 3/02
See application file for complete search history.

(56) References Cited

U.S. PATENT DOCUMENTS 2,356,944 A 8/1944 Peeps
3,552,658 A * 1/1971 Sons ........................ B05B 1/267 251/63
4,091,997 A 5/1978 Ridgway
4,625,917 A 12/1986 Torney
5,522,543 A 6/1996 Herzog
5,823,436 A * 10/1998 Waldrum .................. B05B 1/14 239/456
6,076,744 A 6/2000 O Brien
7,063,280 B1 * 6/2006 Bogart ................. A01C 17/008 239/681
8,444,062 B2 * 5/2013 Anderton .............. E01H 10/007 239/524
8,789,768 B2 7/2014 Hunnicutt et al.
8,864,053 B2 * 10/2014 Anderton .............. E01H 10/007 239/524
9,044,766 B2 * 6/2015 Anderton ................ B05B 1/044
9,486,825 B2 * 11/2016 Ngo .......................... B05B 9/06
9,623,429 B1 * 4/2017 Anderton ................ B05B 1/267
9,955,669 B2 5/2018 Herring, II et al.
9,981,276 B2 5/2018 Kah, III
2012/0196034 A1 * 8/2012 Cordani .................... E01H 3/02 427/136

(Continued)

OTHER PUBLICATIONS

Oct. 10, 2024, USPTO, International Search Report and Written Opinion for PCT/US2024/033685.

*Primary Examiner* — Joseph A Greenlund

(74) *Attorney, Agent, or Firm* — Invention To Patent Services; Alex Hobson

(57) ABSTRACT

A manual spray limiter system for a water truck spray nozzle utilizes a water truck a manual spray limiter coupled to the spray nozzle of a water truck and configured to receive water from the water tank. The water truck spray nozzle has a spray slot extending from a first end to a second end that is configured to produce a water spray therefrom having a spray angle. The manual spray limiter is configured to manually actuate over a portion of the spray slot to reduce the spray angle and save water. A first manual spray limiter may actuate over the first end over the spray slot and a second manual spray limiter may actuate over the second end of the spray slot. A retainer arm secures the limiter plate in a fixed position to block water flow from the spray nozzle.

19 Claims, 7 Drawing Sheets

(56) References Cited

U.S. PATENT DOCUMENTS

| | | | | |
|---|---|---|---|---|
| 2014/0070027 A1* | 3/2014 | Anderton | E01H 3/02 239/518 |
| 2023/0311140 A1* | 10/2023 | Erickson | B05B 7/0853 239/8 |

* cited by examiner

MANUAL SPRAY LIMITER FOR WATER TRUCK SPRAY NOZZLE

BACKGROUND OF THE INVENTION

Field of the Invention

The invention relates to a manual spray limiter for a water truck spray nozzle.

Background

Water trucks are used to spray roadways and worksites and utilize a spray nozzle that has a wide spray angle, such as more than 100 degrees and often times, more than 120 degrees. In many situations, the spray in not required over this large spray angle and much of the water spray is wasted. As a result, water trucks have to return to a filling station more often and have more limited spray range as the water spray is wasted. This costs more money and takes more time.

SUMMARY OF THE INVENTION

The invention is directed to a manual spray limiter system for a water truck spray nozzle that utilizes a water truck spray nozzle with a manual spray limiter. The water truck spray nozzle is coupled to a water truck and configured to receive water from a water tank on said water truck. The water truck spray nozzle has a spray slot extending from a first end to a second end that is configured to produce a water spray therefrom having a spray angle. The manual spray limiter is configured to manually actuate over a portion of the spray slot to reduce the spray angle and save water. In an exemplary embodiment, a water spray nozzle is configured with a first manual spray limiter that actuates over the first end over the spray slot and a second manual spray limiter that actuates over the second end of the spray slot.

The manual spray limiter includes a limiter plate that actuates, such as by rotation along a spray slot. The limiter plate may have a limiter flange that extends over the spray slot to prevent water from being emitted from the spray slot. The limiter plate may include a plurality of cleats that are configured to be retained by a retainer, such as a retainer arm, having a cleat aperture to receive one of said cleats therein or therearound to secure the limiter plate in a fixed position. In an exemplary embodiment the cleats are configured along a radius of curvature and extend from the limiter plate and the retainer arm can be actuated to remove a first cleat from the cleat aperture and then the limiter plate can be rotated to position a second cleat in the cleat aperture and the retainer arm can be actuated to secure the cleat in the cleat aperture. The cleats may also couple with the limiter flange and extend such that the cleat aperture in the retainer arm can be configured around or over the cleat.

The spray slot may extend along a curve and the limiter flange may also extend along a curve to effectively block the water spray from the spray slot. The spray slot may extend along a slot radius of curvature and the limiter flange may extend along a flange radius of curvature that is within 10% of the slot radius of curvature. The limiter flange may extend an arc from a leading edge to a trailing edge and this arc may be of about 20 degrees or more, about 30 degrees or more, about 40 degrees or more, about 60 degrees or more, about 75 degrees or more, about 90 degrees or more and any range between and including the arcs provided. from a leading edge to a trailing edge.

The spray slot of a water truck spray nozzle may produce a spray angle of about 30 degrees or more and usually produces a spray angle of about 60 degrees or more, about 90 degrees or more, about 100 degrees or more, or even 140 or more, or as much as 160 or 180 degrees or more. The water truck spray nozzle may have a cylindrical shape having a radius, and the spray slot may extend along a portion of the cylinder wall along the radius of the cylinder wall. The spray slot extends a length from a first end to a second end and this length may be about 10 cm or more, about 20 cm or more, about 30 cm or more, about 40 cm or more, about 50 cm or more and any range between and including the length values provided.

The limiter plate of the manual spray limiter may extend over a top of the spray nozzle and the limiter flange may extend down over the spray nozzle and over the spray slot when actuated by rotating the limiter plate about the limiter pivot. A retainer arm may be coupled to the manual spray limiter and be fixed with respect to the limiter plate, whereby the limiter plate can be actuated, or rotated to configured one of the cleats, coupled to the limiter plate, in the cleat aperture of the retainer arm. The manual spray limiter may be attached to the spray nozzle, such as by a fastener, such as a screw or bolt, for example. The limiter plate may rotate about a limiter pivot that extends from the retainer arm, whereby the limiter plate is coupled to the retainer arm by the limiter pivot.

The limiter plate of the manual spray limiter may include a plurality of cleats to enable specific incremental adjustment of the limiter plate position over the spray slot to control the spray angle. A limiter plate may have cleats configured along an arc as described herein and may include three or more cleats, four or more cleats, five or more cleats, six or more cleats, eight or more cleats, ten or more cleats and any range between and including the number of cleats provided. The cleats may be positioned a cleat offset arc that may be about 45 degrees or less, about 30 degrees or less, about 20 degrees or less, about 10 degrees or less, or even about 5 degrees or less. An adjustment of about 10 to 20 degrees would be suitable for most applications. A limiter plate with a larger number of cleats would enable more fine tuning of the spray angle adjustment.

The retainer arm has a cleat aperture configured to couple with a cleat to retain the limiter plate in a rotational position with respect to the spray slot. The cleat aperture may be a through hole in the retainer arm or a notch that secures a cleat in place. The retainer arm extends from a fixed end to an extended end. The fixed end may extend past the limiter plate limiter pivot and over the edge or end of the limiter plate, such that the fixed end can be secured with a fastener. The extended end may extend radially past the limiter plate or limiter flange and may extend radially over the spray nozzle to allow easy manual manipulation of the extended end for disengagement of the cleat aperture with a cleat. For example, the extended end may extend over the spray nozzle and thereby produce a retainer arm handle that can be lifted up to disengage the cleat aperture from a cleat. Then the limiter plate can be rotated, and the retainer arm can be lowered down onto a second cleat to change the spray angle. The handle may be the extended end of the retainer arm or may include a handle affixed to the retainer arm, such as an extension or a coating such as a rubber or plastic coating and the extend end may be bent or may flare outward to produce a more ergonomic and comfortable handle for actuation.

A spray nozzle for a water truck may have a cylindrical shape or face having the spray slot extending radially along the slot face of the spray nozzle. The slot face of the spray nozzle may extend along a radius of curvature, and this enables a limiter plate to rotate about a pivot and move along this radius of curvature wherein the limiter flange moves over a portion of the spray slot to reduce the spray angle. A spray nozzle for a water truck may be a full cylinder shape or have a circular cross-sectional shape along the spray slot, or may be duck-bill shaped, with the slot face being cylindrical in shape, more like a disc shape than a cylindrical pipe.

The invention includes a method of modifying or changing the spray angle from a water truck spray nozzle including providing a manual spray limiter system as shown and described herein. The manual spray limiter may be coupled to a water truck spray nozzle by fastening the manual spray limiter system to the water truck spray nozzle, such as with bolts or screws. A fastener may extend through the retainer arm and into the water truck spray nozzle with the limiter plate extending over the water truck spray nozzle and being configured to rotate with respect to the retainer arm. A portion of the limiter plate, such as a limiter flange may extend over the spray slot or spray nozzle opening of the water truck spray nozzle as described herein. The limiter plate may be rotated to couple one of the plurality of cleats with the retainer arm. The manual spray limiter system may include two manual spray limiters, having a limiter plate that rotates from a first end of the spray slot and the other having a limiter plate that rotates from a second end of the spray slot. The spray angle may be reduced by actuating one or both of the limiter plates over a portion of the spray slot and securing the limiter plate to the retainer arm.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
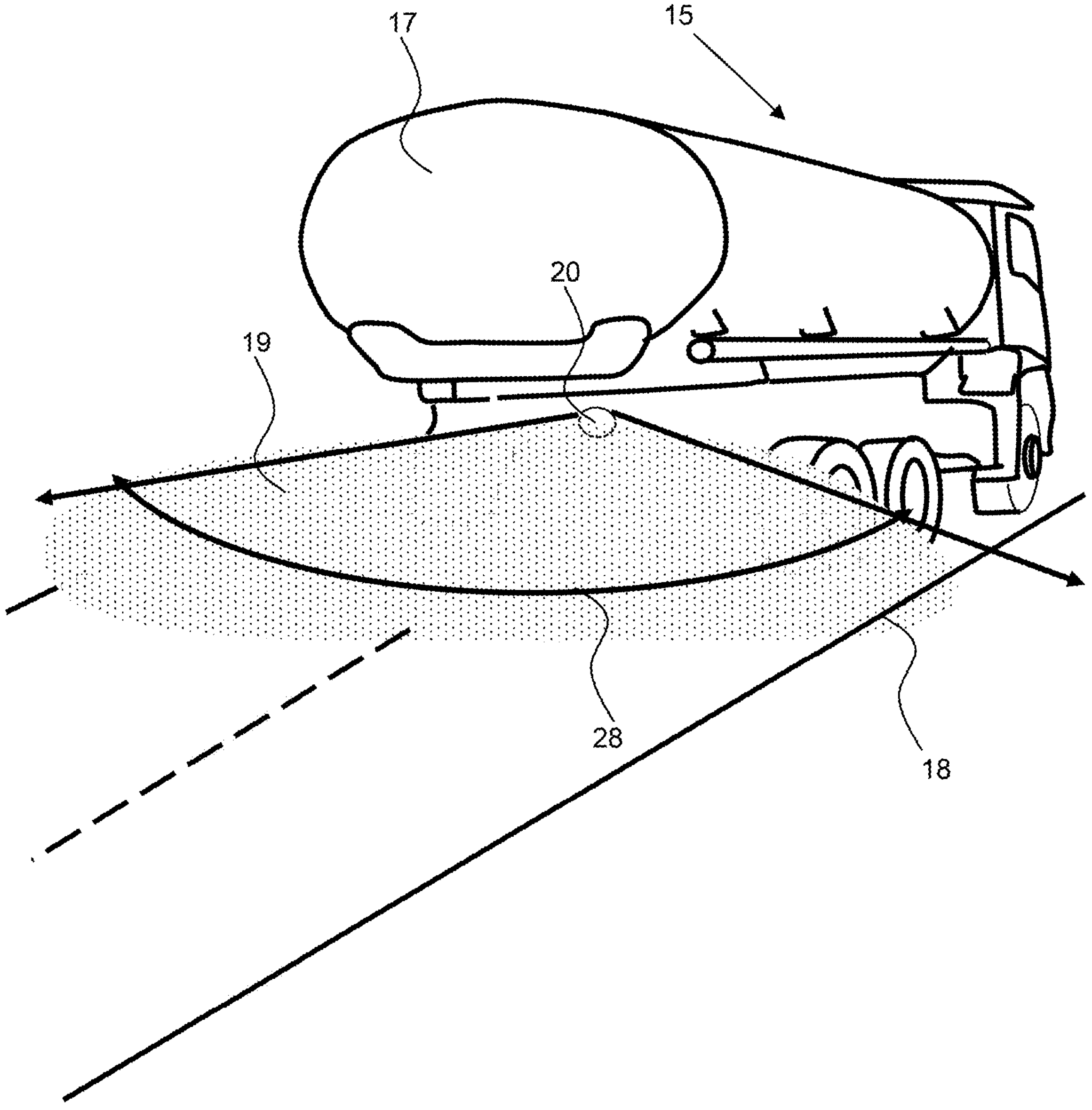
FIG. 1 shows a perspective view of a water truck that is spraying water from water truck spray nozzle onto roadway.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to employ the present invention.

DETAILED DESCRIPTION OF THE ILLUSTRATED EMBODIMENTS

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of “a” or “an” are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
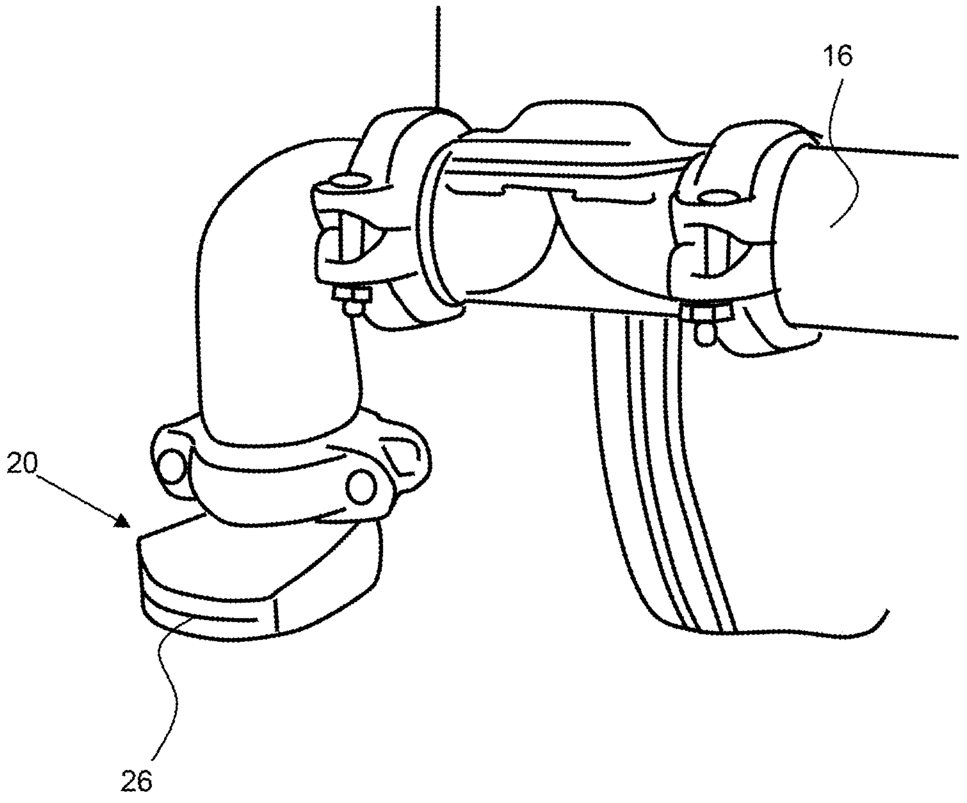
FIG. 2 shows a perspective view of the water truck spray nozzle is coupled with a water conduit that receives water from the water tank on the water truck.
Figure 3:
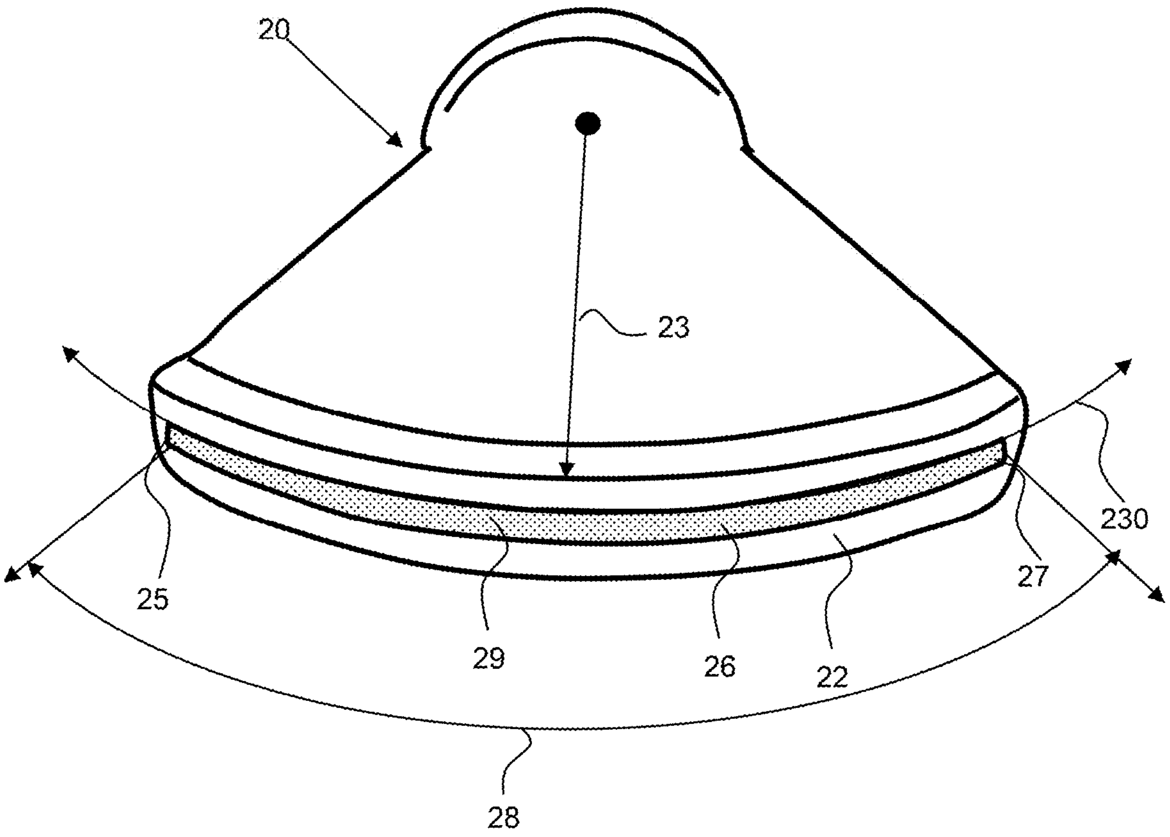
FIG. 3 shows an exemplary water truck spray nozzle having a spray nozzle opening, a spray slot, that extends from a first end to a second end that produces a spray angle of water therefrom.

Referring now to FIGS. 1 to 3, a water truck 15 is spraying water 18 from water truck spray nozzle 20 onto roadway and the water spray 19 from the water spray nozzle has a spray angle 28. The water truck has a water-truck tank 17 or reservoir that is limited and the range that the water truck can spray is limited by the amount of water in the reservoir. When the spray angle is much greater than what is required for the job, the range of the water truck may be less than desired.

As shown in FIG. 2, a water truck spray nozzle 20 is coupled with a water conduit 16 that receives water from the water tank on the water truck.

As shown in FIG. 3, an exemplary water truck spray nozzle 20 having a spray nozzle opening 26, a spray slot 29, that extends from a first end 25 to a second end 27 to produce a water spray 19 across a spray angle 28 of water therefrom.

As shown in FIG. 3, the water truck spray nozzle 20 has a slot face 22, the surface along which the spray slot extends into the water truck spray nozzle for receiving a flow of water, and this surface is a curved surface that may be cylindrical in shape and may extend along a slot radius of curvature 23 or along a slot arc 230, which may be the radius of curvature of the slot face. The spray slot extends along a curve or arc from the first end 25 to the second end 27 and the arc may extend about 20 degrees or more, about 30 degrees or more, about 45 degrees or more, about 60 degrees or more, 90 degrees or more, 100 degrees or more, or even 120 degrees or more and any range between and including the values provided.

Figure 4:
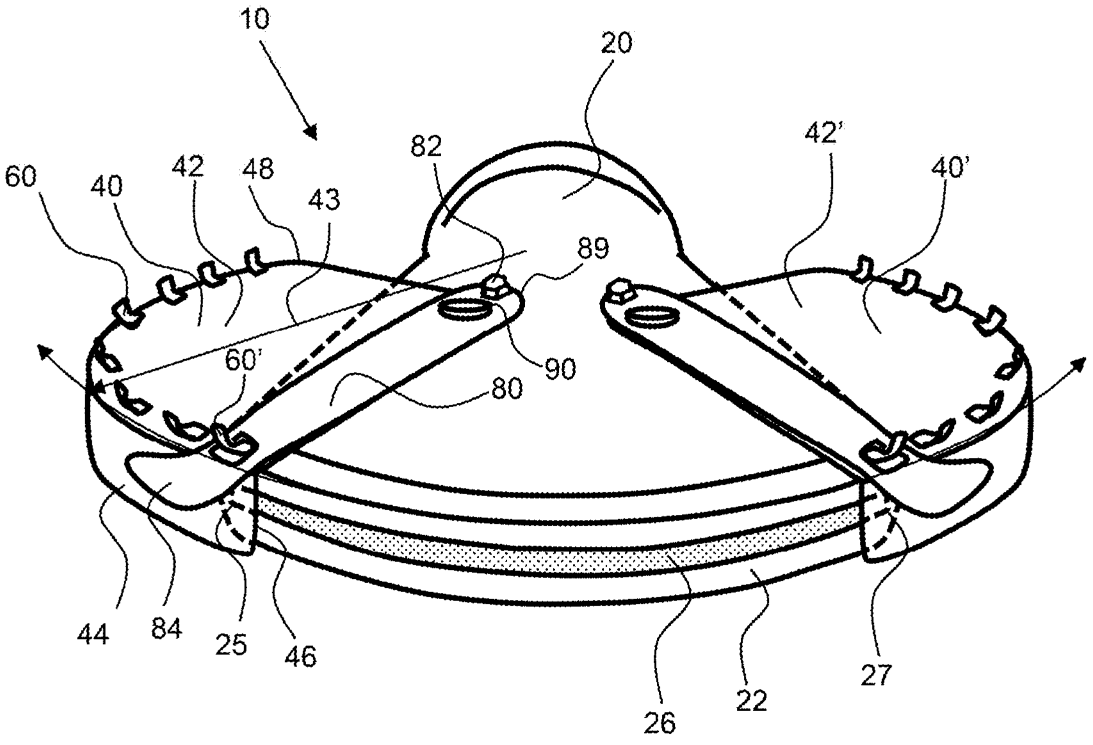
FIG. 4 shows a front perspective view of a water truck spray nozzle with a manual spray limiter system configured thereon and having two manual spray limiters, with a first manual spray limiter configured to rotate over the spray nozzle opening, or spray slot from the first end and a second manual spray limiter configured to rotate over the spray slot from the second end.
Figure 5:
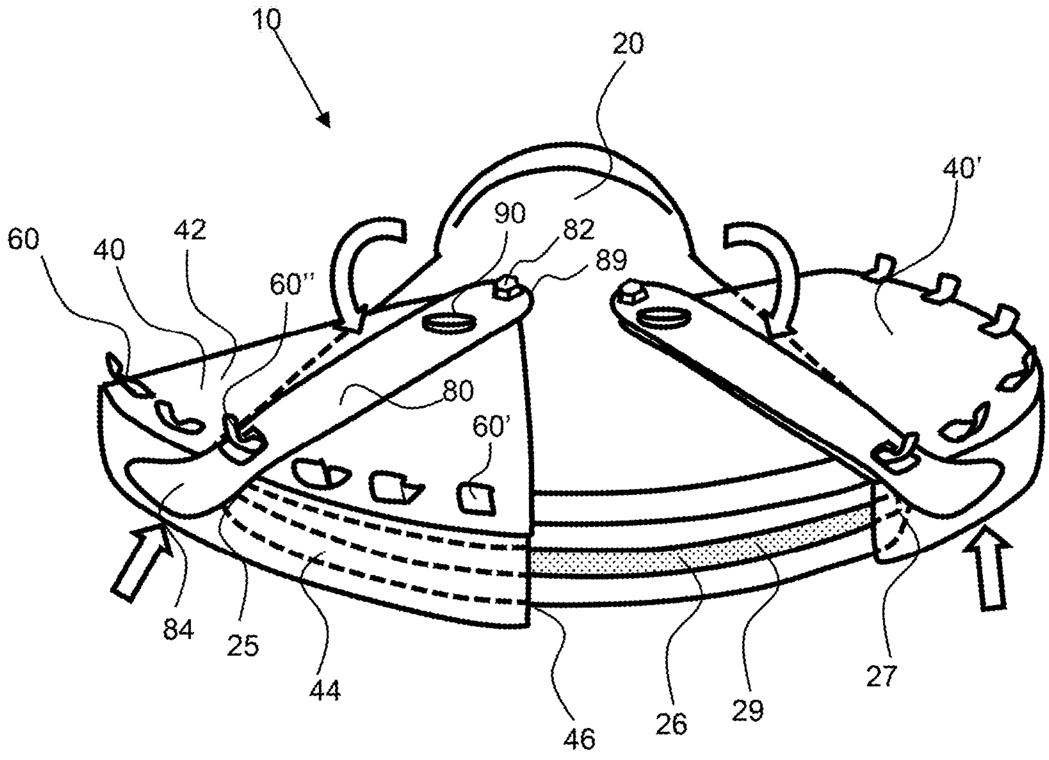
FIG. 5 shows a front perspective view of a water truck spray nozzle with a manual spray limiter system as shown in FIG. 4 now with the first manual spray limiter rotated to cover a portion of the spray slot and with the retainer arm retaining different cleat from that shown in FIG. 4.
Figure 6:
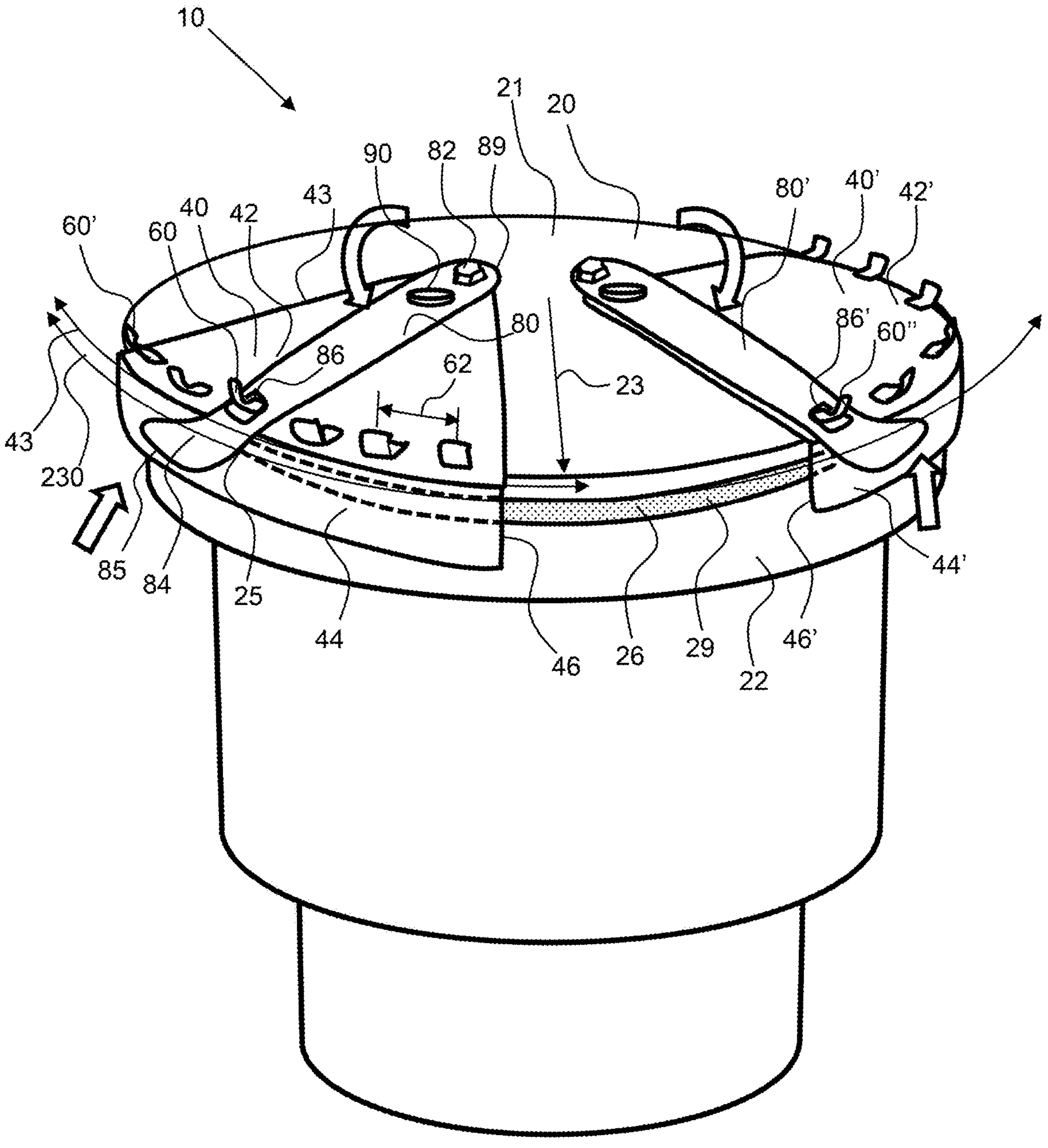
FIG. 6 shows a front perspective view of a water truck spray nozzle with a manual spray limiter system configured thereon and having two manual spray limiters, with a first manual spray limiter configured to rotate over the spray nozzle opening, or spray slot from the first end and a second manual spray limiter configured to rotate over the spray slot from the second end.

Referring now to FIGS. 4 to 6, a water truck spray nozzle 20 has a manual spray limiter system 10, incorporating two manual spray limiters 40, 40' mounted to the spray nozzle and configured to pivot to close off a portion of the spray nozzle opening 26. Each of the manual spray limiters have a limiter flange 44 that can be pivoted across the spray nozzle opening to reduce the water spray angle to save water and prolong the range of the water truck application of water. The limiter flange 44 is coupled to the limiter plate 42 having a plurality of cleats 60 to secure the limiter plate to the retainer arm 80. The retainer arm 80 has a cleat aperture 86 to receive a cleat therein and secure the limiter plate 42 in a rotational position with respect to the spray nozzle opening 26. The retainer arm 80 can be lifted manually by pushing on the retainer arm handle 84, (indicated by the large arrow) on the extended end 85 of the retainer arm and then the limiter plate 42 can be rotated about the limiter pivot 90 to configure a different cleat 60 through the cleat aperture 86. One or both of the limiter plates 42, 42' may be rotated to provide a desired water spray angle. The retainer arm 80 extends from a fixed end 89 to an extended end 85 and a retainer arm handle 84 enables the retainer arm to be actuated away from the limiter plate 42 to move the cleat aperture 86 of the retainer arm off of a cleat 60, and then the retainer plate may be rotated or pivoted about the limiter pivot 90 to position a different or second cleat through the cleat aperture 86 to change the spray angle of a water spray from the water truck spray nozzle 20.

As shown in FIG. 4 the limiter flange 44 extends has a cylindrical shape and may extend along a flange radius of curvature 43 that substantially matches the slot radius of curvature 23 of the slot face 22 (shown in FIG. 3), wherein the flange radius of curvature 43 of the limiter flange 44 is about 10% or less, and preferably 5% of less, or even 2% or less different from the slot radius of curvature 23 of the slot face 22 to enable the limiter flange to effectively block water spray from the spray slot.

As shown in FIG. 5, the water truck spray nozzle 20 now has the first manual spray limiter 40 rotated to cover a portion of the spray slot 29 with the retainer arm 80 retaining different cleat 60" from the cleat 60' that extends through the cleat aperture 86 shown in FIG. 4. The leading edge 46 of the limiter flange 44 is actuated manually over the spray slot 29 such that the limiter flange 44 covers a portion of the spray nozzle opening 26, or spray slot 29. The limiter flange extends along a curve or arc from the leading edge 46 to the trailing edge 48 and the arc may extend about 15 degrees or more, about 20 degrees or more, about 30 degrees or more, about 45 degrees or more, about 60 degrees or more and any range between and including the values provided.

FIG. 6 shows a water truck spray nozzle 20 with a manual spray limiter system 10 configured thereon and having two manual spray limiters 40,40', with a first manual spray limiter 40 configured to rotate over the spray nozzle opening 26, or spray slot from the first end and a second manual spray limiter configured to rotate over the spray slot from the second end. As shown in FIG. 6, the water truck spray nozzle 20 has a cylindrical shape and has a top plate 21, and the spray slot extends along a curved surface that may extend along a slot radius 23 of curvature 23 or slot arc 230 and the limiter flange 44 may also extend along a matching curve or flange radius of curvature 43. The double arrowed curved lines extend along the radius of curvature as described.

As shown in FIG. 6, manual spray limiters 40, 40' are coupled to the water truck spray nozzle 20, with the limiter plates 42,42' extending over the top plate 21 and the retainer flanges 44, 44' extending down over the slot face 22 and the spray slot 29. The limiter flanges extend generally orthogonally within about 80 to 100 degrees of the plane of the limiter plate or plane of the top plate 21. The retainer arm 80 has a cleat aperture 86 configured to couple with a cleat 60 to retain the limiter plate 40 in a rotational position with respect to the spray slot. The cleat aperture may be a through hole in the retainer arm or a notch that secures a cleat in place. The retainer arm extends from a fixed end 89 to an extended end 85 thereby having or forming a retainer arm handle 84. The fixed end may extend past the limiter pivot 90 and over the edge or end of the limiter plate, such that the fixed end can be secured with a fastener 82, such as a screw or bolt. The extended end may extend radially past the limiter plate or limiter flange and may extend radially over the spray nozzle to allow easy manual manipulation of the extended end for disengagement of the cleat aperture with a cleat. As shown, the extended end extends over the water truck spray nozzle 20 and thereby produces a retainer arm handle 84 that can be lifted up to disengage the cleat aperture from a cleat (indicated by the bold arrow). Then the limiter plate 40 can be rotated and the retainer arm can be lowered down onto a second cleat 60 to change the spray angle.

As shown in FIG. 6, each of the first and second manual spray limiters 40,40' have six cleats and the cleats extend a cleat offset arc 62 that is about 20 degrees or less. As shown, the first manual spray limiter 40 has the limiter plate actuated, such that the fourth cleat from the leading edge 46 of the limiter plate 40 is retained in the cleat aperture 86 of the retainer arm 80. The second manual spray limiter 40' is configured with the first cleat 60" from the leading edge 46' of the limiter plate 40' retained in the cleat aperture 86' of the retainer arm 80'. The limiter plate may be coupled to the retainer arm about the limiter pivot, which may be a stud or post extending from the retainer arm with the limiter plate having a pivot aperture that extends over the post of the limiter pivot.

As shown in FIG. 6, the two manual spray limiters 40, 40' are shown configured to pivot about separate pivots 90, 90', however, they may both pivot about a central pivot, centrally located on the top plate 21, or centrally located with respect to the cylindrical water truck spray nozzle 20, to provide proper radius of rotation for the limiter flanges along the slot face 22. Both of the retainer arms may be coupled together as well, with one or more of the fasteners 82 coupling the two retainer arms 80, 80' to the water truck spray nozzle 20, such as to the top plate 21.

Figure 7:
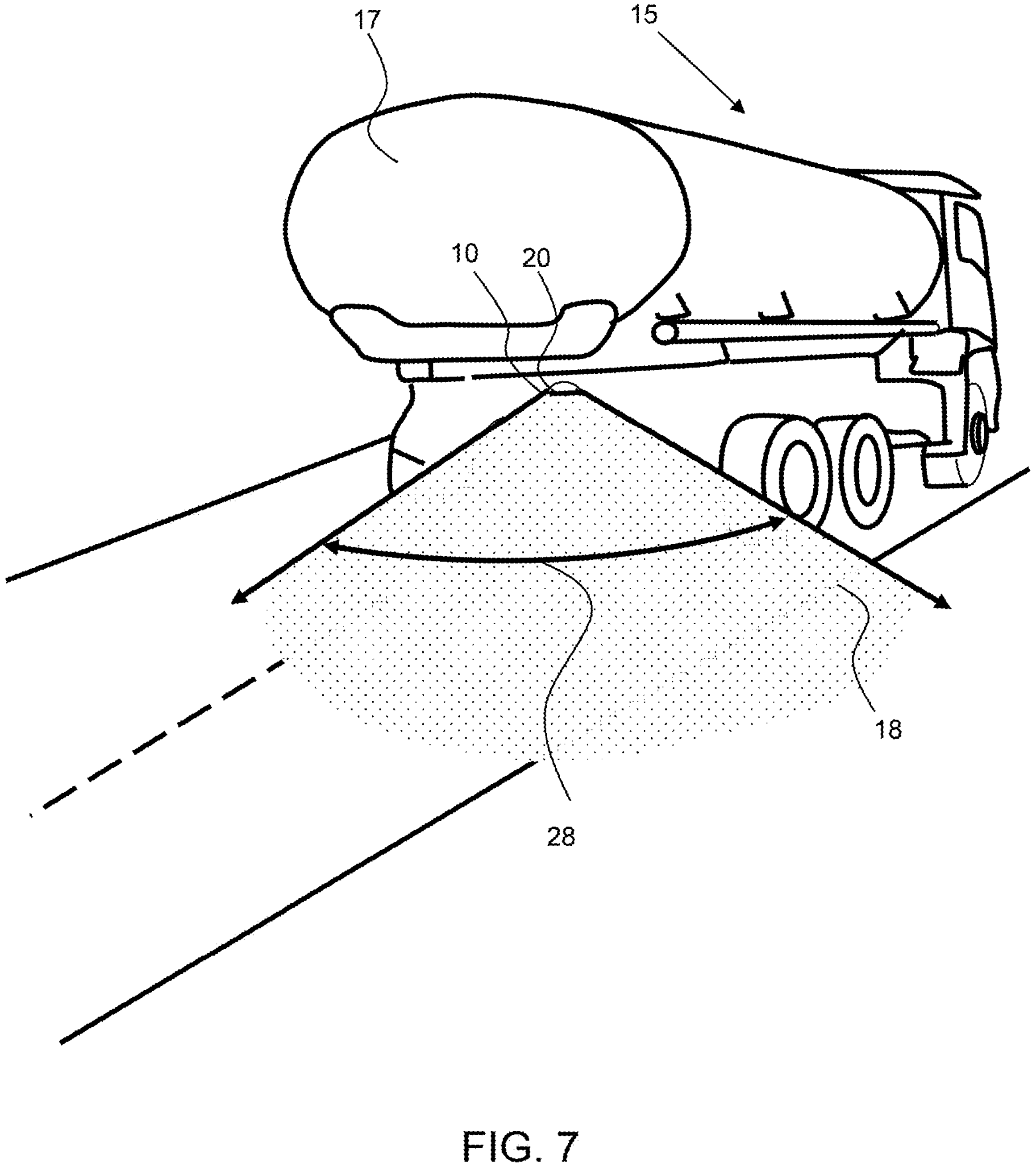
FIG. 7 shows a perspective view of the water truck shown in FIG. 1, now with a reduced spray angle from that shown in FIG. 1, as both of the manual spray limiters are pivoted over a portion of the spray slot.

FIG. 7 shows a perspective view of the water truck shown in FIG. 1, now with a reduced spray angle from that shown in FIG. 1, as both of the manual spray limiters are pivoted over a portion of the spray slot.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention covers the modifications, combinations and variations of this invention provided they come within the scope of the appended claims and their equivalents.

What is claimed is:

1. A manual spray limiter system for a water truck spray nozzle comprising:
  a) said water truck spray nozzle coupled to a water truck and configured to receive water from a water tank on said water truck, said water truck spray nozzle comprising:
    i) a spray slot extending from a first end to a second end and configured to produce a water spray therefrom having a spray angle;
  b) a first manual spray limiter;
  c) a second manual spray limiter;
    wherein each of the first manual spray limiter and second manual spray limiter comprise:
      i) a limiter plate having a limiter flange that extends over the water truck spray nozzle and comprising a leading edge of the limiter flange;
      ii) a limiter pivot coupled to the limiter plate and wherein the limiter plate is configured to pivot about said limiter pivot to actuate the limiter flange over the spray slot of the water truck spray nozzle;
      iii) a retainer arm extending from a fixed end to an extended end and comprising a retainer arm handle;
    wherein the retainer arm is configured to couple with the limiter plate to secure the limiter plate in a rotational position with respect to said limiter pivot;
    wherein the limiter plate of the first manual spray limiter is pivotably coupled to the water truck spray nozzle and configured to pivot about said limiter pivot of the first manual spray limiter to actuate the leading edge of the limiter flange over the first end of the spray slot to change the spray angle; and
    wherein the limiter plate of the second manual spray limiter is pivotably coupled to the water truck spray nozzle and configured to pivot about said limiter pivot of the second manual spray limiter to actuate the leading edge of the limiter flange over the second end of the spray slot to change the spray angle.

2. The manual spray limiter system of claim 1, wherein the spray slot extends along a curve and wherein the limiter flange also extends along said curve to effectively block the water spray from the spray slot.

3. The manual spray limiter system of claim 1, wherein the spray slot extends along a slot radius of curvature and the limiter flange extends along a flange radius of curvature that is within 10% of the slot radius of curvature.

4. The manual spray limiter system of claim 3 wherein the water truck spray nozzle has a cylindrical shape.

5. The manual spray limiter system of claim 4, wherein the spray angle of the spray slot is at least 30 degrees.

6. The manual spray limiter system of claim 3, wherein the spray slot extends from said first end to said second end, a length of at least 10 cm.

7. The manual spray limiter system of claim 1, wherein the limiter flange further comprises a trailing edge and extends at least 20 degrees from said leading edge to said trailing edge.

8. The manual spray limiter system of claim 1, wherein the manual spray limiter further comprises a plurality of cleats coupled to the limiter plate.

9. The manual spray limiter system of claim 8, wherein the plurality of cleats includes three cleats that are positioned along a radius of curvature from the limiter pivot.

10. The manual spray limiter system of claim 9, wherein the retainer arm further comprises a cleat aperture in the retainer arm configured to couple with one of said plurality of cleats to retain the limiter plate in a rotational position with respect to the spray slot.

11. The manual spray limiter system of claim 10, wherein the water truck spray nozzle has a cylindrical shape with a top plate and wherein the limiter plates of both the first and second manual spray limiters extend over the top plate and are coupled with a pivot centrally located on the top plate.

12. The manual spray limiter system of claim 11, wherein the retainer arm extends beyond the slot face and beyond the retainer flange to the extended end of the retainer arm.

13. The manual spray limiter system of claim 12, wherein the retainer arm comprises a retainer arm handle.

14. The manual spray limiter system of claim 12, wherein the retainer arm extends over the limiter plate to a fixed end and wherein the extended end of the retainer arm is configured to be manually lifted up from the limiter plate to rotate the limiter plate to a rotational position with the limiter flange configured over a portion of the spray slot.

15. A manual spray limiter system for a water truck spray nozzle comprising:
  a) said water truck spray nozzle coupled to a water truck and configured to receive water from a water tank on said water truck, said water truck spray nozzle comprising:
    i) a spray slot extending from a first end to a second end and configured to produce a water spray therefrom having a spray angle;
    wherein the spray slot extends from a first end to a second end, a length of at least 10 cm;
    wherein the spray slot extends along a slot radius of curvature; and
    wherein the spray angle of the spray slot is at least 30 degrees;
  b) a first manual spray limiter;
  c) a second manual spray limiter;
    wherein each of the first manual spray limiter and second manual spray limiter comprise:
      i) a limiter plate having a limiter flange that extends over the water truck spray nozzle;
      wherein the limiter flange extends at least 20 degrees from a leading edge to a trailing edge; and
      wherein the limiter flange extends along a flange radius of curvature that is within 10% of the slot radius of curvature;
      ii) a limiter pivot coupled to the limiter plate and wherein the limiter plate is configured to pivot about said limiter pivot to actuate the limiter flange over the spray slot of the water truck spray nozzle;
      iii) a plurality of cleats including three cleats that are positioned along a cleat radius of curvature from the limiter pivot;
      iv) a retainer arm extending from a fixed end to an extended end and comprising a retainer arm handle;
    wherein the retainer arm is configured to couple with the limiter plate to secure the limiter plate in a rotational position with respect to said limiter pivot;
    wherein the limiter plate of the first manual spray limiter is pivotably coupled to the water truck spray nozzle and configured to pivot about said limiter pivot of the first manual spray limiter to actuate the leading edge of the limiter flange over the first end of the spray slot to change the spray angle; and wherein the limiter plate of the second manual spray limiter is pivotably coupled to the water truck spray nozzle and configured to pivot about said limiter pivot of the second manual spray limiter to actuate the leading edge of the limiter flange over the second end of the spray slot to change the spray angle.

16. The manual spray limiter system of claim 15, wherein the water truck spray nozzle has a cylindrical shape.

17. The manual spray limiter system of claim 16, wherein the retainer arm further comprises a cleat aperture in the retainer arm configured couple with one of said Plurality of cleats to retain the limiter plate in a rotational position with respect to the spray slot.

18. The manual spray limiter system of claim 17, wherein the retainer arm extends beyond the slot face and beyond the retainer flange to the extended end of the retainer arm.

19. The manual spray limiter system of claim 18, wherein the retainer arm extends over the limiter plate to a fixed end and wherein the extended end of the retainer arm is configured to be manually lifted up from the limiter plate to rotate the limiter plate to a rotational position with the limiter flange configured over a portion of the spray slot.

* * * * *